United States Patent
Gabara

(12) 
(10) Patent No.: US 6,292,557 B1
(45) Date of Patent: Sep. 18, 2001

(54) APPARATUS AND METHOD TO INSERT THE DEFAULT LOCAL AREA CODE INTO A DIALED TELEPHONE NUMBER

(75) Inventor: Thaddeus John Gabara, Murray Hill, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/144,099

(22) Filed: Aug. 31, 1998

(51) Int. Cl.$^7$ ..................................................... H04M 1/56
(52) U.S. Cl. ............................................................. 379/355.08
(58) Field of Search ..................................... 379/354, 355, 379/356, 357; 455/564

(56) References Cited

U.S. PATENT DOCUMENTS

| | | | |
|---|---|---|---|
| 5,475,743 | * 12/1995 | Nixon et al. | 379/113 |
| 5,722,088 | * 2/1998 | Storn et al. | 455/564 |
| 5,859,901 | * 1/1999 | Brendzel et al. | 379/114 |
| 5,917,904 | * 6/1999 | Theis | 379/355 |

OTHER PUBLICATIONS

Jones "Hot Line Two: Telephone Dialing via a Modem" Oct. 1998, Link Up, pp. 7,20.*

\* cited by examiner

*Primary Examiner*—Tālivaldis Ivars Šmits
(74) *Attorney, Agent, or Firm*—William H. Bollman

(57) ABSTRACT

Apparatus and process for searching for an area code from an exchange/area code directory and inserting an area code into a dialed telephone number. The inserted area code is based on the three digit exchange prefix of the dialed telephone number. An area code insertion module includes at least one entry comprising an association between an exchange number and an area code. A controller compares the digits corresponding to the exchange of a seven digit dialed telephone number with entries in the exchange/area code directory. The controller adds the resultant area code obtained from the exchange/area code directory together with any other special dialing digits required to dial such a telephone number before the digits of the dialed telephone number. A DTMF generator causes the completed telephone number to be presented to the telephone line and central office. The area code insertion module and/or the exchange/area code directory may be maintained at the customer premises equipment or at the central office. The entries in the exchange/area code directory may be pre-stored by the user or downloaded over the public switched telephone network, e.g., from a central office.

17 Claims, 4 Drawing Sheets

APPARATUS AND METHOD TO INSERT THE DEFAULT LOCAL AREA CODE INTO A DIALED TELEPHONE NUMBER

BACKGROUND OF THE INVENTION

1. Field of the Invention

This invention relates generally to an apparatus and method for inserting an area code into a dialed telephone number. More particularly, it relates to an apparatus and method which allows a prestored area code to be automatically inserted into a dialed telephone number.

2. Background of Related Art

The number of area codes in the United States are proliferating at an increasing rate. Hundreds of new area codes have been created in just the past few years. The increased number of area codes have resulted from an increased consumer demand, e.g., for multiple telephone lines for services such as additional home or business lines, facsimile machines, internet and/or e-mail services, etc. Many of the new area codes created by the local telephone companies comprise existing telephone lines which are divided or "split" from regions comprised of old area codes. Most new area codes are the result of divisions of old area code regions, but some are generally created as an "overlay" within original geographical regions served by original area codes. In an overlay region, the area code in the original geographical regions is served not only by the original area code but additionally by a new area code.

The creation of new area codes at the current accelerated rate, whether created by "split" or by "overlay", has added additional confusion for the typical telephone consumer when attempting to dial telephone numbers within these areas. For instance, in an increasing number of areas around the country, telephone consumers are now required to dial ten (10) digit telephone numbers for every call, even local calls, whereby in the past the telephone consumer was only required to dial a seven-digit telephone number. Moreover, due to the proliferation of new area codes, previous telephone calls to other telephones within the same region might now be a telephone call to a different area code. Unfortunately, ten digit dialing, whether required for all calls or just for those which would now reside in a different area code, increases the time necessary to dial telephone numbers, and might also require a user to relearn telephone numbers with a new area code.

FIG. 4 illustrates a conventional area code scheme showing an original area code geographical region 111 having an original area code (910), and the addition of new area codes (619) and (333) by the "overlay" method and the "split" method, respectively.

In particular, in the example of FIG. 4, an original area code, e.g., (910), is shown as being originally assigned to a geographic region 111. However, due to an increase in demand for additional telephone numbers, the local telephone company is shown to have split the geographic region 111 into two new area codes, e.g., (619) and (333). Due to decisions within the local telephone company, the new area code (333) is shown to have split from a region including the original area code (910) by dividing the geographic region 111 into a first geographic region 113 and a second geographic region 115. As a result of the split, the original area code (910) may, as shown in the given example, remain assigned to the first geographic region 113 and a new area code (333) may be assigned to the second geographic region 115. Furthermore, additional phone numbers may be provided in the first geographic region 113 by creating a new area code, e.g., (619) as an overlay to the original area code (910). In an overlay situation, both the original area code, e.g., (910), and the new overlayed area code, e.g., (619), are assigned to a common geographic region, e.g., the first geographic region 113.

Unfortunately, in the given example, a telephone consumer located in a city 117 in the original geographic region 111 might find themselves in a confusing situation after the new area codes (619) and (333) have been added to what used o be a homogeneous region comprising only one area code, e.g., (910). For instance, when a telephone consumer in the city 117 now attempts to make a telephone call to a telephone consumer in another city, e.g., in city 119 located in the second geographic region 115, the telephone consumer in the city 117 will be conventionally required to manually insert the new area code, e.g., (333) into the telephone number which may have been dialed previously either without any area code included (i.e., seven digit dialing), or with the same area code as the caller included, e.g., (910). Thus, the consumer must be acutely aware of the divisions of nearby geographic regions and their respective area codes as they change over time. With the larger number of area codes and continual changes over time, this becomes increasingly difficult.

Likewise, when a telephone consumer in the city 117 now attempts to make a telephone call to a relatively new telephone consumer in another city 121 located in the same first geographic region 113 as the telephone consumer in the city 117, the telephone consumer in the city 117 will be required to dial ten digits including the overlay area code, e.g., (619), or (619) 555-1212, particularly if the telephone consumer in the city 121 acquired their telephone number after the creation of the overlay area code (619) in the first geographic region 113.

Accordingly, there exists a need for an apparatus and method which allows a user to continue to use a seven digit telephone number for calls to telephone numbers in regions which were previously part of a same area code region even after new area codes are introduced into that original area code region.

SUMMARY OF THE INVENTION

In accordance with the principles of the present invention, an area code insertion module for a telephone comprises a storage device comprising at least one pre-stored portion of a telephone number associated with a pre-stored area code. A processor compares a portion of a dialed telephone number with at least one pre-stored portion in the storage device, and inserts an area code into the dialed telephone number if a match is found between the portion of the dialed telephone number and a corresponding portion of the telephone number in the storage device.

A method of adding an area code to a dialed telephone number in accordance with the principles of the present invention comprises capturing a dialed telephone number before initiating a connection to a desired party. An area code corresponding to at least a portion of the dialed telephone number is obtained, and a connection to the desired party is initiated using both the obtained area code and the dialed telephone number.

A method of adding an area code to a dialed telephone number in accordance with another aspect of the present invention comprises capturing a dialed telephone number before initiating a connection to a desired party. A default area code is added to the captured dialed telephone number if the dialed telephone number is less than a ten digit telephone number. A connection is initiated to the desired party using both the default area code and the dialed telephone number.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides telephone equipment, indicated generally at 10, which inserts prefix digits into a dialed telephone number, e.g., an area code into a seven digit telephone number. A dialed exchange number is compared to pre-stored entries in an exchange/area code directory and an area code is obtained and inserted into the dialed telephone number before the dialed digits by an area code insertion module.

Figure 1:
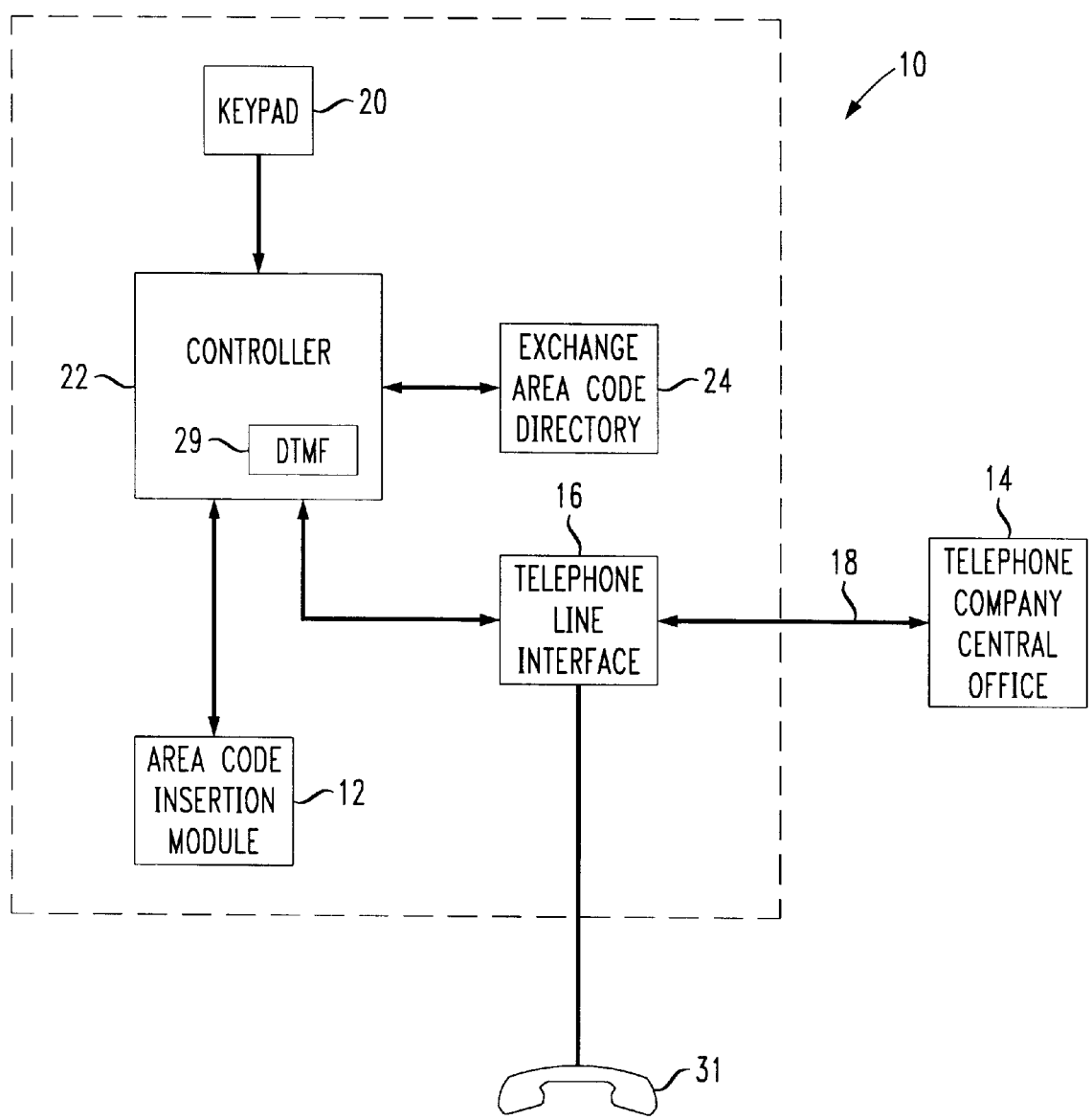
FIG. 1 illustrates a block diagram of a telephone including an area code insertion module and exchange/area code directory constructed in accordance with the principles of the present invention wherein an area code is inserted into a dialed telephone number.

For instance, FIG. 1 shows an embodiment of a customer premises equipment which inserts an area code in a telephone number based on the dialed local exchange.

In FIG. 1, a telephone 10 includes conventional components, e.g., a telephone line interface (TLI) 16, a controller 22, an alpha-numeric keypad 20 and a handset 31. The alpha-numeric keypad 20 allows the entry of a telephone number, which is detected by the controller 22. The controller 22 may be any appropriate processor, e.g., a microprocessor, a digital signal processor (DSP), or a microcontroller. The controller 22 does not provide the dialed digits of the telephone number to the TLI 16 and telephone line 18 until after a determination is made as to whether or not an area code is to be added.

Importantly, the telephone 10 shown in FIG. 1 further includes an exchange/area code directory 24 and an area code insertion module 12.

The exchange/area code directory 24 includes a database associating specific exchange numbers, i.e., the first three digits in a seven digit telephone number in the United States typically identifying a switch at a central office, with desired area codes.

The present invention takes advantage of the fact that most (if not all) divisions of area code regions by local telephone companies place individual exchanges in only one area code, new or old. Thus, after re-division of an area code region, the affected exchanges are typically assigned to only one area code. Thus, after re-division, a new area code may be associated with all telephone lines serviced under a particular exchange number.

Of course, any one specific three digit exchange number can and is likely to be used in more than one area code region throughout the country. The present invention relates to local telephone numbers or telephone numbers which were within a common area code region before re-division, and thus multiple use of an exchange within nearby area codes is slight. Nevertheless, if a particular exchange number is used in more than one of the new area code regions created within what was previously a single original area code, then preferably the entries with respect to that exchange number will not be included in the exchange/area code directory. In such a case, the user would be required to manually or otherwise enter all ten digits for these telephone numbers as in conventional telephones. However, to the extent that particular exchange numbers remain unique within what was originally a single area code region, those new area code numbers can be associated with those particular exchange numbers in the database of the exchange/area code directory 24.

Alternatively, even if the area codes are the same, a proper area code can be selected from among possible choices based on user input in response to prompts provided based on information in the database in the exchange/area code directory 24.

Entries in the exchange/area code directory 24 may be prestored either by the user of the telephone, the manufacturer of the telephone 10, and/or downloaded from the telephone company central office 14 via the telephone line 18.

In particular, to pre-store entries in the exchange/area code directory 24, the user may be prompted by an appropriate application program running in the controller 22 to associate a particular area code number with a particular exchange number. This association may be performed generally for exchange numbers or specifically for identified telephone numbers.

Similarly, the manufacturer of the telephone equipment 10 can establish a universal database of exchange numbers and area code numbers and install the same in non-volatile memory accessible by the controller 22. However, because of the large number of area codes and local exchanges in the United States, if the database in the exchange/area code directory 24 is preloaded with entries associating particular exchange numbers and area codes, it is preferable that the user be prompted to insert the local area code of the telephone 10 when initially installing the telephone 10, and to customize the database in the exchange/area code directory 24 accordingly, so that only applicable portions of a more general database may be utilized.

In operation, one embodiment of the controller 22 detects the entry of the digits of telephone numbers as they are entered into the keypad 20. Thus, in this case, if only seven digits are dialed within a predetermined amount of time, and/or if the first three digits match an entry in the exchange/area code directory 24, the area code associated with the entered exchange number from the database of the exchange/area code directory 24 is inserted by the controller 22 before the dialed seven digits of the dialed telephone number, preferably before it is presented to the telephone company central office 14 over the telephone line 18. When the complete ten digit telephone number is determined by the controller 22, either as a result only of manual entry into the keypad 20 by the user in which case the area code insertion module 12 is not activated, or by insertion of an area code into a dialed seven digit telephone number, a dual tone, multiple frequency (DTMF) generator 29 either incorporated within the controller 22, other processor, or other device external to the controller 22, is instructed to output DTMF tones on the telephone line 18 corresponding to the ten digits of a telephone number in accordance with current area code assignments.

In an alternative embodiment, the user may prompt the controller 22 to determine and insert an appropriate area code by inputting an appropriate code, e.g., by pressing the star '*' key or pound '#' key before (or after) dialing the telephone number.

The database of the exchange/area code directory 24 can alternatively be downloaded from the telephone company central office 14, e.g., upon installation of the telephone 10 and/or when instructed by the user. In this case, a modem may be included in the telephone 10 to receive data from another modem at the telephone company central office 14. Ideally, a special telephone number would be dialed at the telephone 10 to establish a connection to a modem at the telephone company associated with that special telephone number.

Alternatively, the exchange/area code directory 24 and/or the area code insertion module 12 can be maintained at the telephone company central office 14. In this case, the telephone company central office 14 would insert a presumed area code of a dialed seven digit telephone number based on, e.g., closest proximity to the location of the telephone line and/or recent changes to area code assignments. The exchange/area code directory 24 can be updated on a more frequent periodic or occasional basis if it is installed at the telephone company central office 14.

Furthermore, the telephone consumer can modify the entries in the exchange/area code directory 24 by simply calling a designated telephone number at the central office 14 and adding or deleting entries via instruction to the controller 22 through the keypad 20 of the telephone 10.

Figure 2:
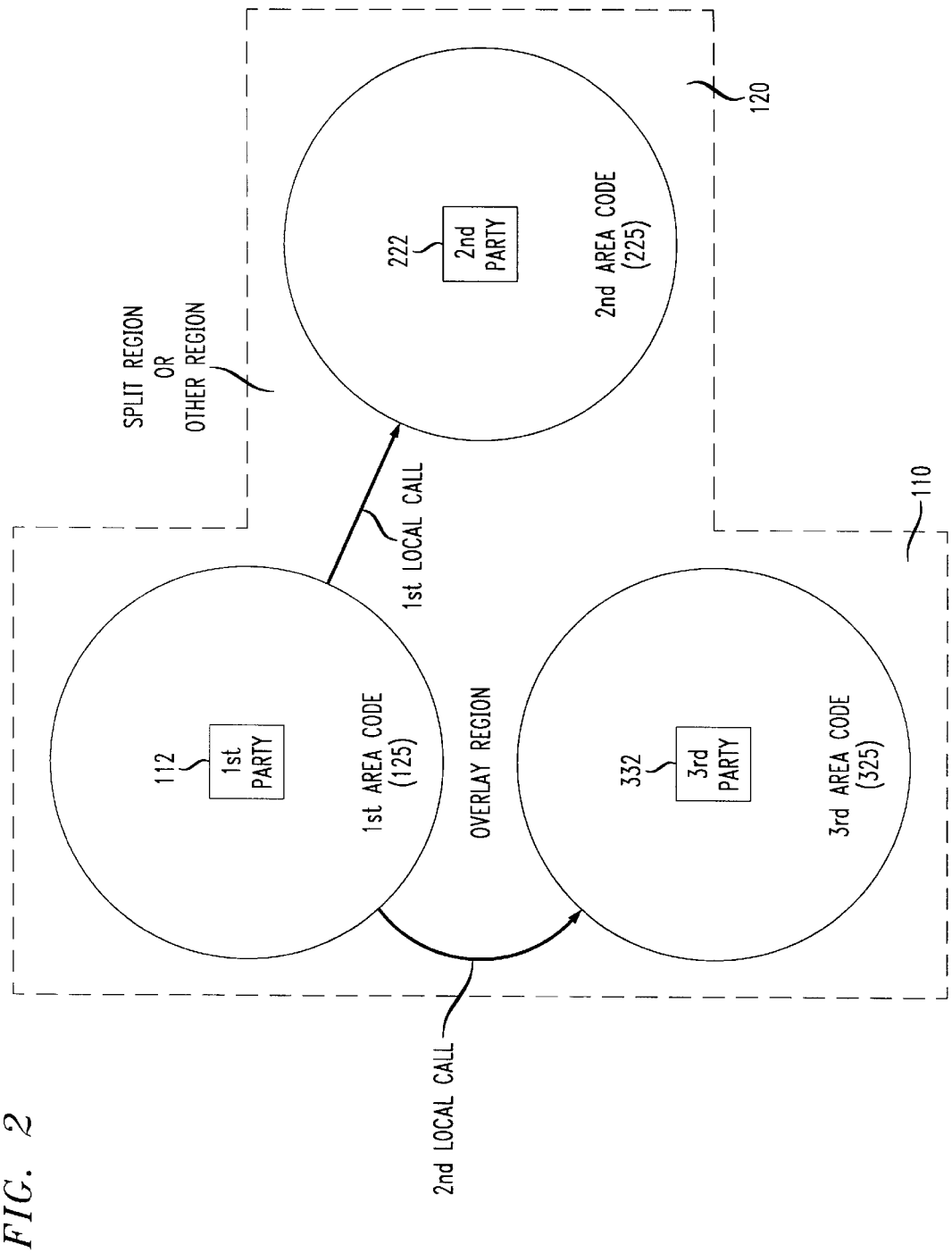
FIG. 2 illustrates a schematic view of a first party calling from a first area code in a first geographical region to a second party with a second area code in a different second geographical region, and of that first party calling to a third party with a third area code in the same first geographical region as the first party, utilizing the area code insertion module and exchange/area code directory shown in FIG. 1.

FIG. 2 illustrates a useful exemplary situation showing the effects of the area code insertion module 12 and exchange/area code directory 24 in accordance with the principles of the present invention.

In the example of FIG. 2, three area codes (125), (225) and (325) are created within a relevant region. In this example, assume that the first area code (125) is the original area code for the geographic region 110. Subsequently, a second area code (225) becomes assigned to another geographic region 120 as the result of a "split" of the original geographic region 110. Moreover, assume that the third area code (325) subsequently becomes created as an "overlay" within the original geographic region 110. Thus, the second area code (225) and the third area code (325) are both co-existent with the original area code (125).

Moreover, assume that a first party 112 is located in the area corresponding to the first area code (125), a second party 222 is located in the area corresponding to the second area code (225), and a third party 332 is located in the same area corresponding to the first party but has a third area code (325). Assume also for purposes of this disclosure that a telephone call between the first party 112 in the first area code (125) and the second party 222 in the second area code (225) is a toll-free, local telephone call. Likewise, for purposes of discussion, assume that a telephone call between the first party 112 in the first area code (125) and in the third area code (325) are overlay areas, so a call from the first party to the third party is likely to be a toll-free, local telephone call.

Deactivation of the area code insertion module 12 can be accomplished by depressing a certain key or series of keys on the keypad 20 of the telephone 10 as determined by the manufacturer or telephone consumer as necessary. Thus, special keys on the telephone can be assigned to relate to the acceptance of area codes obtained by the area code insertion module 12, and/or to bypass or disregard the automatic insertion of the area code. Moreover, the area code insertion module 12 can be deactivated upon the entry of ten or more digits in a telephone number.

Figure 3:
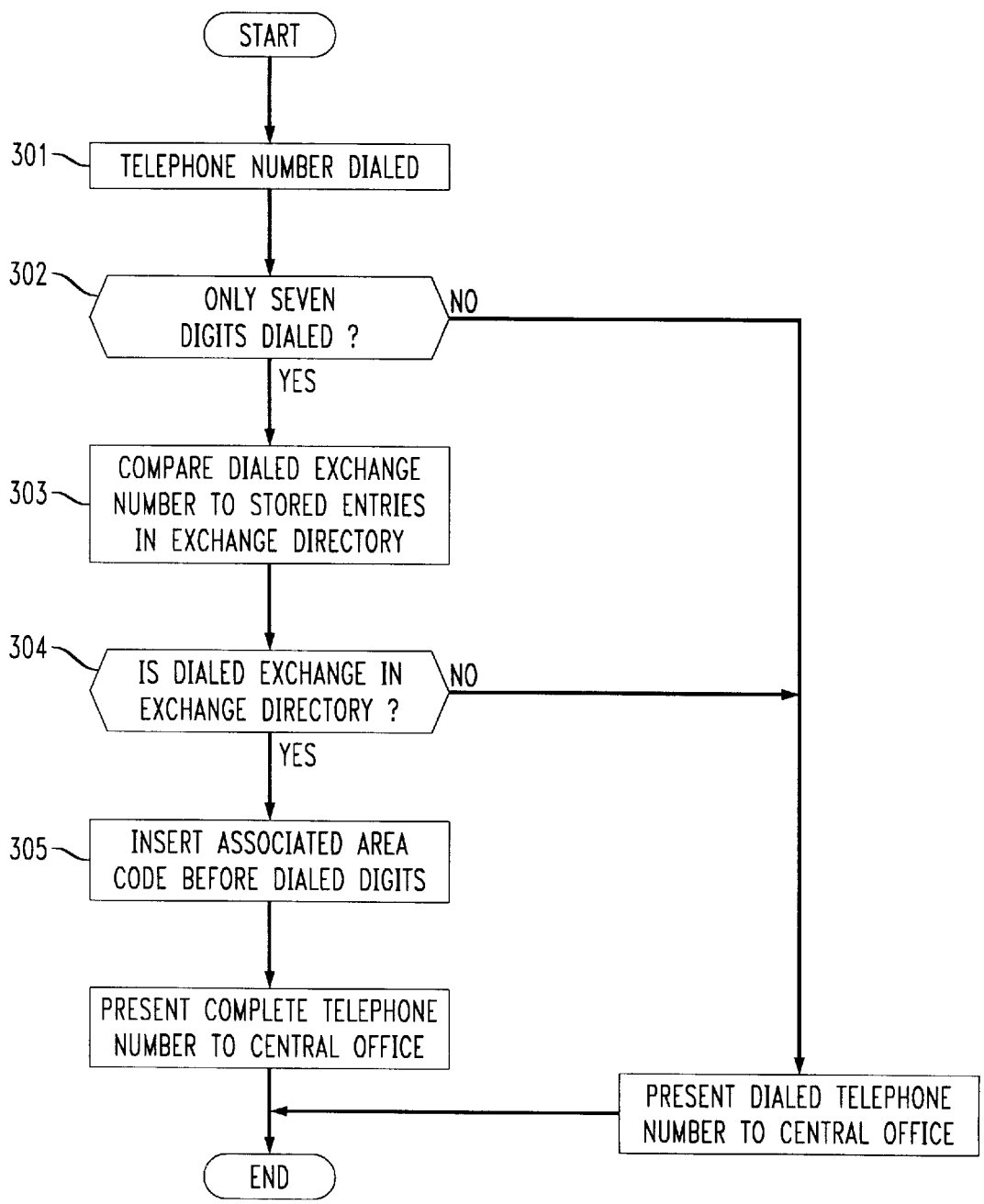
FIG. 3 is a flow chart illustrating a process by which a first party calling from a first area code makes a telephone call to a second party in a second area code in accordance with the principles of the present invention wherein the area code of the called party is inserted into the dialed telephone number before the three digit exchange prefix.
Figure 4:
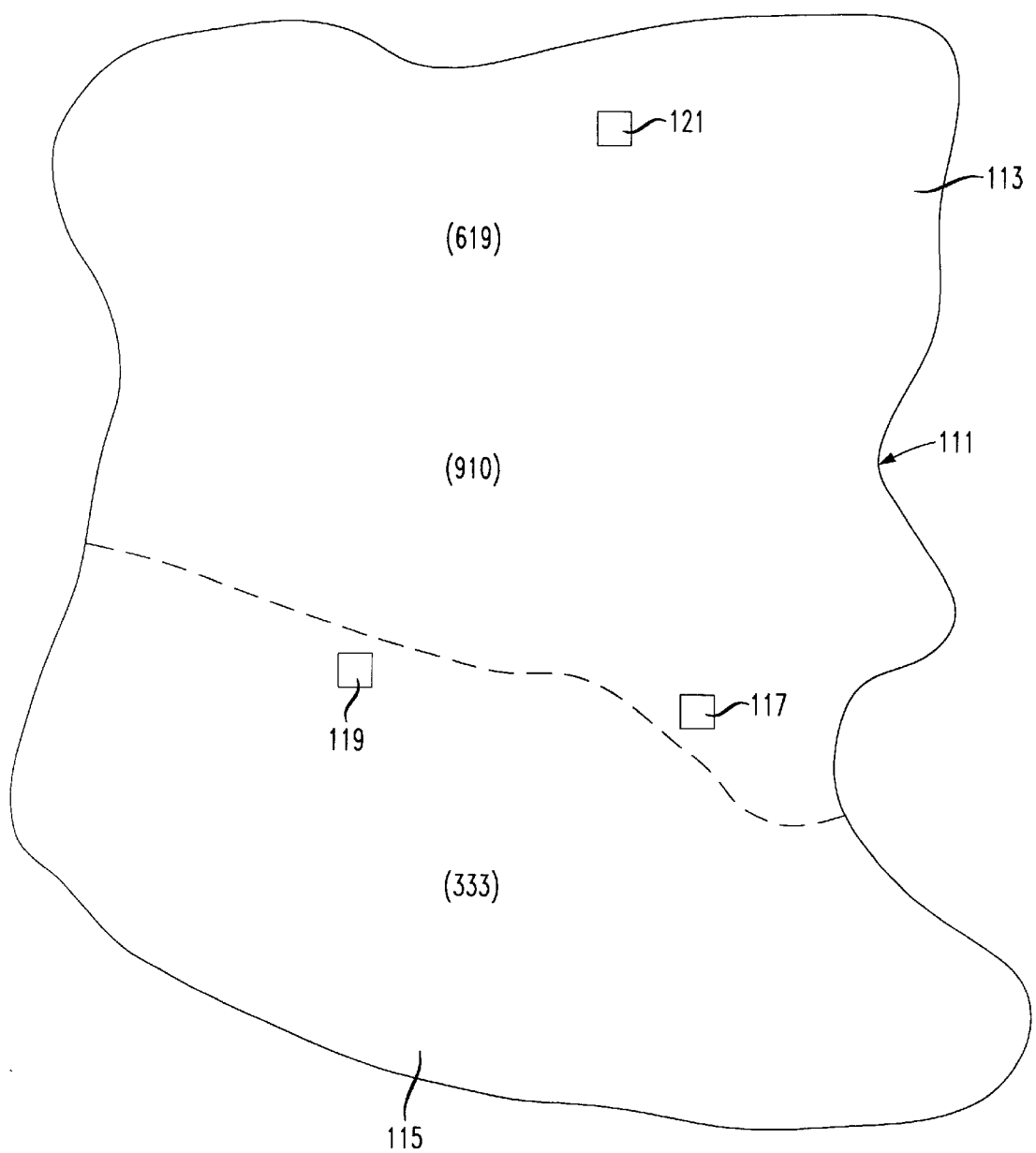
FIG. 4 illustrates a conventional area code scheme showing a geographic region having an originally assigned area code and two newly added area codes by the "split" method and by the "overlay" method, respectively.

FIG. 3 is a flow chart showing the process by which the area code insertion module 12 inserts an area code into the telephone number based on the three digit exchange of the dialed telephone number. For purposes of discussion, the process is described with respect to the area code insertion module 12 being installed either in the telephone consumer's telephone 10 or in the telephone company central office 14.

With reference to FIGS. 1, 2, and 3, in the first step 301, the first party 112 having a first area code, e.g., (125) dials a seven digit telephone number corresponding to a second party 222 having a second area code, e.g., (225).

In step 302, the process continues only if seven digits were dialed.

In step 303, the three digit exchange of the dialed telephone number is compared to pre-stored entries in the exchange/area code directory 24 and a comparison is performed by the controller 22 between the dialed exchange and each of the pre-stored entries.

If no match is found in step 304, the telephone number will be presented to the telephone company central office 14 as dialed, preferably together with a default area code, e.g., the area code of the caller.

However, in step 305, if the exchange of the second party's telephone number does match a pre-stored three digit exchange in an entry in the exchange/area code directory 24, the area code, e.g., (225) of the second party 222 is automatically inserted into the dialed telephone number by the area code insertion module 12 and the controller 22 to allow the first party 112 to be connected to the second party 222.

The area code insertion module 12 can also accomplish automatic insertion of digits relating to additional dialing requirements caused as a result of area code splitting or overlaying. For instance, if the second party 222 becomes a long distance call to the first party 112 such that the telephone company central office 14 would then require an additional digit, e.g., a "1" before the area code, the database of the exchange/area code directory 24 can be enlarged to include such a long distance designator. In this case, the area code insertion module 12 would output a complete telephone number, in this case eleven digits in length including a "1" before the otherwise ten digit telephone number, in accordance with the principles of the present invention.

While the invention has been described with reference to the exemplary embodiments thereof, those skilled in the art will be able to make various modifications to the described embodiments of the invention without departing from the true spirit and scope of the invention.

What is claimed is:

1. A local area code insertion module for a telephone, comprising:

a storage device having stored upon it at least one local exchange number associated with a pre-stored default local area code;

a processor adapted to count the number of digits of a dialed telephone number, and to insert said associated pre-stored default local area code into said dialed telephone number if said dialed telephone number is less than ten digits.

2. The local area code insertion module according to claim 1, wherein:

said processor is adapted to insert said local area code before said local exchange number portion of said dialed telephone number.

3. The local area code insertion module according to claim 1, wherein:

said storage device is a memory device.

4. The local area code insertion module according to claim 1, wherein:

said area code insertion module is adapted for deactivation when a dialed telephone number comprises at least ten digits.

5. The local area code insertion module according to claim 1, wherein:

said storage device further includes a corresponding long distance access code associated with each area code that is different from said pre-stored local area code.

6. A method of adding a default local area code to a dialed telephone number, comprising:

capturing a dialed telephone number before initiating a connection to a desired party;

obtaining said default local area code corresponding to at least a local exchange number of said dialed telephone number; and appending said default local area code before said dialed telephone number to create a telephone number recognized by a local telephone company as a local call; and initiating a connection to said desired party using both said obtained default local area code and said dialed telephone number.

7. The method of adding local area code to a dialed telephone number according to claim 6, wherein:

said telephone number is captured before presentation to a telephone line.

8. The method of adding a local area code to a dialed telephone number according to claim 6, wherein:

said dialed telephone number is a seven digit telephone number.

9. The method of adding a local area code to a dialed telephone number according to claim 6, further comprising:

deactivating said method when said dialed telephone number comprises at least ten digits.

10. Apparatus for adding a default local area code to a dialed telephone number, comprising:

means for capturing a dialed telephone number before initiating a connection to a desired party;

means for obtaining said default local area code corresponding to at least a local exchange number of said dialed telephone number; and means for appending said default local area code before said dialed telephone number to create a telephone number recognized by a local telephone company as a local call; and means for initiating a connection to said desired party using both said obtained default local area code and said dialed telephone number.

11. The apparatus for adding a local area code to a dialed telephone number according to claim 10, wherein:

said telephone number is captured before presentation to a telephone line.

12. The apparatus for adding a local area code to a dialed telephone number according to claim 10, wherein:

said dialed telephone number is a seven digit telephone number.

13. The apparatus for adding a local area code to a dialed telephone number according to claim 10, wherein:

said means for initiating a connection is deactivated when said dialed telephone number comprises at least ten digits.

14. A method of adding a local area code to a dialed telephone number, comprising:

capturing a dialed telephone number before initiating a connection to a desired party;

adding a default local area code to said captured dialed telephone number if said dialed telephone number is less than a ten digit telephone number; and initiating a connection to said desired party using both said default local area code and said dialed telephone number.

15. The method of adding a local area code to a dialed telephone number according to claim 14, further comprising:

adding a long distance code to said captured dialed telephone number with added default area code.

16. The method of adding a local area code to a dialed telephone number according to claim 15, wherein:

said long distance code is a '1'.

17. Apparatus for adding a local area code to a dialed telephone number, comprising:

means for capturing a dialed telephone number before initiating a connection to a desired party;

means for adding a default local area code to said captured dialed telephone number if said dialed telephone number is less than a ten digit telephone number; and means for initiating a connection to said desired party using both said default local area code and said dialed telephone number.

* * * * *